L. J. WESTBROOK.
RULE.
APPLICATION FILED APR. 26, 1912.
1,059,797. Patented Apr. 22, 1913.
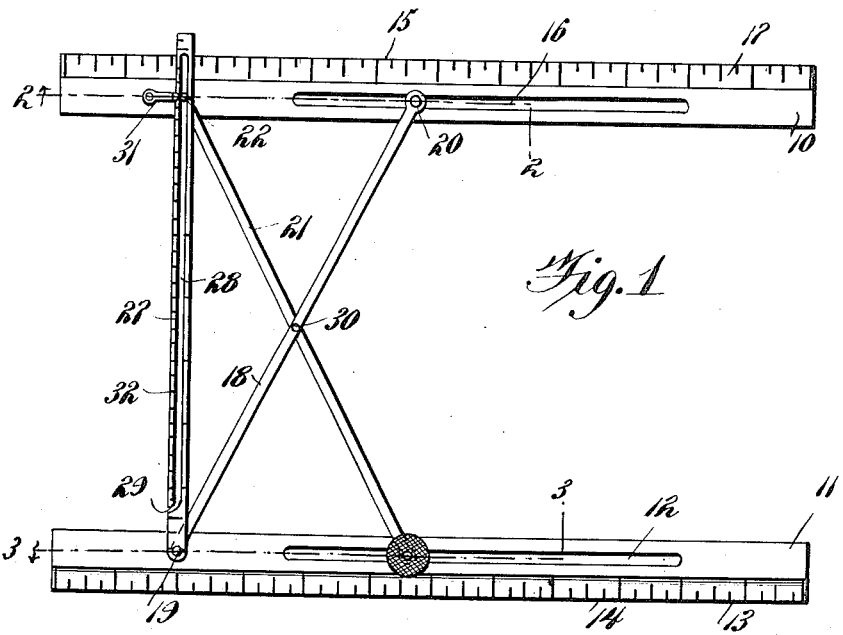
Fig. 1
Fig. 3
Fig. 2
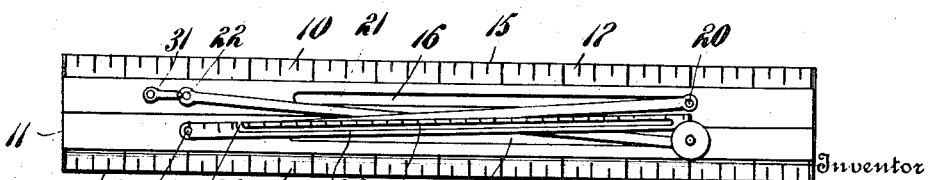
Fig. 4
Witnesses
Inventor
L. J. Westbrook
By Victor J. Evans
Attorney

UNITED STATES PATENT OFFICE.

LUTHER J. WESTBROOK, OF WALESKA, GEORGIA.

RULE.

1,059,797.  Specification of Letters Patent.  Patented Apr. 22, 1913.

Application filed April 26, 1912. Serial No. 693,306.

*To all whom it may concern:*

Be it known that I, LUTHER J. WESTBROOK, a citizen of the United States, residing at Waleska, in the county of Cherokee and State of Georgia, have invented new and useful Improvements in Rules, of which the following is a specification.

An object of the invention is to provide a rule for drawing parallel lines.

The invention embodies, more particularly, a rule for drawing parallel lines and which can be adjusted to predetermine the distance between the parallel lines that are to be drawn, the rule being foldable so that when folded the rule will take up a very small space and can be easily carried in the pocket.

In the further disclosure of the invention reference is to be had to the accompanying drawings constituting a part of this specification, in which similar characters of reference denote corresponding parts in all the views, and in which:

Figure 1 is a front elevation of the rule, showing the same in open position; Fig. 2 is a horizontal sectional view taken on the line 2—2 in Fig. 1; Fig. 3 is a horizontal sectional view taken on the line 3—3 in Fig. 1; and Fig. 4 is a front elevation of the rule, showing the same in folded position.

Referring more particularly to the views, use is made of a plurality of rule bodies 10, 11 the rule body 11 being provided with a longitudinally extending slot 12 and having a straight edge 13, the mentioned rule body 11 being preferably provided with a series of graduations 14. The rule body 10 is similar in shape and construction to the rule body 11 with the exception that the straight edge 13 of the rule body 11 is at the lower end of the rule body, whereas the straight edge 15 of the rule body 10 is at the upper edge of the rule body, the mentioned rule body 10 being provided with a longitudinally extending slot 16, preferably having thereon a series of graduations 17.

A rod 18 is pivotally mounted on the rule body 11 by a pin 19 and journaled on the upper end of the rod 18 is a roller 20 operable in the slot 16 of the rule body 10, a second rod 21 being pivotally mounted on the rule body 10 by a pin 22 and extending downwardly in diagonal relation to the rod 10, a roller 23 being journaled on a threaded rod 23$^a$ carried on the lower end of the rod 21, the said roller being operable in the slot 12 of the rule body 11. A toothed wheel 24 is journaled on the rod 23$^a$ and the teeth of the wheel 24 mesh with teeth 25 formed on a rack 26 secured to a side of the rule body 11, a milled knob 23$^b$ having threaded connection with the threaded end of the rod 23$^a$ and adapted to abut against the rod 21 when the knob is screwed up on the rod 23$^a$, thus clamping the lower end of the rod 21 against the lower rule body 11, it being readily seen by referring to the views that the toothed wheel 24 is of greater diameter than the width of the slot 12 in order to insure the proper clamping of the lower end of the rod 21 against the rule body 11 when the knob is screwed up on the threaded rod 23$^a$. With this construction, it will be seen that when the knob is screwed up on the rod 23$^a$ the rod 21 will be held rigid on the rule body.

Mounted to swing on the rule body 11 by means of the pin 19, provided to connect the rod 18 to the rule body, is a scale member 27 provided with a longitudinally extending slot 28 adapted to receive therethrough the projecting end of the pin 22 provided to pivotally connect the rod 21 and the rule body 10, an opening 29 being provided for the slot 28 at the lower end of the scale member 27 for the purpose of disengaging the scale member from the projecting end of the pin 22 when the rule is folded, as will be hereinafter more fully described. As mentioned heretofore the rod 21 extends diagonally relatively to the rod 18 and at their points of insertion the rods 18 and 21 are pivotally connected by a pin 30, so that when the rule body 10 is moved upwardly the rollers 20, 23 will operate in the slots 16 and 12 to retain the rule bodies 10, 11 in the same parallel relation regardless of the increase or decrease of distance between the rule bodies, a locking member 31 being mounted to swing on the rule body 10 and adapted to engage the scale member 27 to secure the scale member in rigid position relatively to the rule body 10 when the rule bodies 10, 11 have been spaced to the required distance, a series of graduations 32 being provided on the scale member 27 for the purpose of determining the distance between the parallel lines that are to be drawn along the straight edges 13 and 15 of the rule bodies 11 and 10 respectively.

Now assuming that it is desired to draw parallel lines that are spaced four inches apart, the locking member 31 is first disengaged from the scale member 27, after which the rule bodies 10, 11 can be drawn apart or brought together until the graduation denoting four inches registers with the straight edge 15 of the rule body 10, after which the device is placed upon the paper, and the upper line is drawn along the straight edge 15, the lower line being drawn along the straight edge 13 so that the lines, when completed, will be in parallel relation and will be four inches apart. When it is desired to fold the rule bodies as shown in Fig. 4, the rule bodies 10 and 11 are moved together until the pin 22 reaches the opening 29, when, as will be readily understood, the scale member 27 can be swung toward the right to lie along the rule body 11, the rods 18 and 21 being adapted to lie in almost parallel relation in view of the manner in which the rods are mounted, when the rule is in closed position. By providing the toothed wheel 24 in mesh with the rack 26, when the rule bodies have been arranged in the desired spaced relation, the toothed wheel 24 engaging the rack 26 will tend to secure the rule bodies in a relatively rigid position and also provide a means whereby the rule members can be moved apart thus insuring great accuracy in drawing parallel lines.

Having thus described my invention, I claim:

1. In a rule, the combination with a plurality of slotted rule bodies, of a rod pivotally connected to one of the rule bodies, a roller on the free end of the said rod and operable in the slot of the other rule body, a second rod pivotally connected to the other rule body, a roller on the second rod and operable in the slot of the first mentioned rule body, a rack on the first mentioned rule body, a toothed wheel journaled on the second mentioned rod and meshing with the said rack, a slotted scale member mounted to swing on the first mentioned rule body, and a pin extended from the second mentioned rule body and operating in the slot of the said scale member.

2. In a rule, the combination with a plurality of slotted rule bodies, of a rod pivotally connected to one of the rule bodies, a roller on the free end of the said rod and operable in the slot of the other rule body, a second rod pivotally connected to the other rule body, a roller on the second rod and operable in the slot of the first mentioned rule body, a rack on the first mentioned rule body, a toothed wheel journaled on the second mentioned rod and meshing with the said rack, a slotted scale member mounted to swing on the first mentioned rule body, a pin extended from the second mentioned rule body and operating in the slot of the said scale member, and a locking member mounted on the second mentioned rule body for rigidly locking the said scale member relatively to the second mentioned rule body.

3. In combination with a plurality of rule bodies, a rod having pivotal connection with one of the rule bodies and slidable on the other rule body, a slotted scale member having pivotal connection with the first mentioned rule body, and a second rod having an end thereof slidable on the first mentioned rule body and the other end thereof slidable in the slot of the said scale member.

4. In combination with a plurality of rule bodies provided with longitudinally extending slots, a rod having one end thereof pivotally connected with one of the rule bodies and the other end thereof slidable in the slot of the other rule body, a scale member provided with a longitudinally extending slot and having pivotal connection with the first mentioned rule body, and a second rod having an end thereof slidable in the slot of the first mentioned rule body and the other end thereof slidable in the slot of the said scale member.

5. In combination with a plurality of rule bodies each provided with a longitudinally extending slot, a rod having one end thereof pivotally connected with one of the rule bodies and the other end thereof slidable in the slot of the other rule body, a scale member provided with a longitudinally extending slot and having pivotal connection with the first mentioned rule body, a second rod having an end thereof slidable in the slot of the first mentioned rule body and the other end thereof slidable in the slot of the said scale member, and means on the second mentioned rod and having connection with the first mentioned rule body for locking the said second mentioned rod thereto.

6. In combination with a plurality of rule bodies, a slotted scale member having pivotal connection with one of the rule bodies and engaging the other rule body, a rod having pivotal connection with the first mentioned rule body and slidable connection with the second mentioned rule body, and a second rod engaging the first mentioned rule body and operable in the slot of the scale member to permit of relatively adjusting the said rule bodies.

In testimony whereof I affix my signature in presence of two witnesses.

LUTHER J. WESTBROOK.

Witnesses:
J. S. Lewis,
R. E. Ozin.